United States Patent
Gonen

(10) Patent No.: US 7,860,754 B2
(45) Date of Patent: Dec. 28, 2010

(54) SYSTEM AND METHOD FOR OPTIMIZING THE RESERVE PRICE AND ALLOCATION OF WEB PAGE PLACEMENTS IN AN ONLINE KEYWORD AUCTION USING GENERALIZED TRADE REDUCTION

(75) Inventor: Rica Gonen, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 439 days.

(21) Appl. No.: 12/001,702

(22) Filed: Dec. 10, 2007

(65) Prior Publication Data

US 2009/0150278 A1 Jun. 11, 2009

(51) Int. Cl.
*G06Q 30/00* (2006.01)
*G06F 17/30* (2006.01)
(52) U.S. Cl. .......................... 705/26; 705/27
(58) Field of Classification Search ............... 705/26, 705/27, 37
See application file for complete search history.

(56) References Cited

U.S. PATENT DOCUMENTS

| | | | |
|---|---|---|---|
| 2004/0186778 A1* | 9/2004 | Margiloff et al. | 705/14 |
| 2008/0040221 A1* | 2/2008 | Wiseman et al. | 705/14 |
| 2008/0040223 A1* | 2/2008 | Bridges et al. | 705/14 |
| 2008/0082400 A1* | 4/2008 | Martel et al. | 705/10 |
| 2008/0275757 A1* | 11/2008 | Sharma et al. | 705/10 |

OTHER PUBLICATIONS

Google and the Rebirth of Banner Ads Churbuck, David C Business Week (Online) pp. 1 Apr. 26, 2007.*
Mira Gonen, et al. "Generalized Trade Reductions: The Role of Competition in Designing Budget-Balanced Mechanisms" Jul. 23, 2007, pp. 1-34, Jul. 23, 2007.

* cited by examiner

*Primary Examiner*—Jeffrey A Smith
*Assistant Examiner*—Resha Desai
(74) *Attorney, Agent, or Firm*—Law Office of Robert O. Bolan

(57) ABSTRACT

An improved system and method is provided for optimizing the reserve price and allocation of web page placements in an online keyword auction using generalized trade reduction. To do so, a generalized trade reduction engine may be provided to convert an implementation of an online keyword auction into a double-sided auction that may optimize the reserve price and allocation of web page placements to maximize revenue. An online keyword auction may be converted into a double-sided market by turning every bidder in the auction into a buyer and every web page placement into a virtual seller. The allocation of buyers and sellers may be divided into disjoint procurement sets and the generalized trade reduction engine may add or remove procurement sets in iterations until conditions of competition among remaining traders may be fulfilled to optimize the reserve price and allocation of web page placements to maximize revenue.

13 Claims, 4 Drawing Sheets

SYSTEM AND METHOD FOR OPTIMIZING THE RESERVE PRICE AND ALLOCATION OF WEB PAGE PLACEMENTS IN AN ONLINE KEYWORD AUCTION USING GENERALIZED TRADE REDUCTION

FIELD OF THE INVENTION

The invention relates generally to computer systems, and more particularly to an improved system and method for optimizing the reserve price and allocation of web page placements in an online keyword auction using generalized trade reduction.

BACKGROUND OF THE INVENTION

An online auction is a widely used mechanism for selling advertisements using Internet search engines. Each time a user enters a search term into a search engine, the online auction allocates the advertising space within that user's search results. There are hundreds of millions of separate online auctions conducted every day. Search engines' revenues from online auctions are on the order of ten billion dollars per year. As a result, these advertising auctions are receiving considerable attention from practitioners and academics. For example, Abrams, Z., Revenue Maximization When Bidders Have Budgets, In Proceedings the ACM-SIAM Symposium on Discrete Algorithms, 2006, considers the role of bid increment; Feng, J., Bhargava, H., and Pennock, D., Implementing Sponsored Search in Web Search Engines: Computational Evaluation of Alternative Mechanisms, INFORMS Journal on Computing, 2005, consider the implications of ranking rules; and Borgs, C., et al., Multi-Unit Auctions with Budget-Constrained Bidders, In Proceedings the Sixth ACM Conference on Electronic Commerce, Vancouver, BC, 2005 consider the effect of budgets; and Szymanski, B. and Lee, J., Impact of ROI on Bidding and Revenue in Sponsored Search Advertisement Auctions, Second Workshop on Sponsored Search Auctions, 2006, use simulations to study sponsored search auctions.

However, these theoretical analyses of online auctions have neglected the role and importance of the reserve price for auctioneers in multi-unit auctions. Myerson, R., Optimal Auction Design, Mathematics of Operation Research 6, 58-73, 1981, proves that adding a reserve price to an otherwise efficient auction is an optimal mechanism in a single-unit auction in the case of symmetric bidders. In general, the auction for search advertisements is a multi-unit auction, and optimal mechanism design in multi-unit auctions are an open problem. See for example, Chawla, C., Hartline, J., Klienberg, B., Approximately Optimal Multi-Product Pricing, with and without Lotteries, Bay Algorithmic Game Theory Symposium, September 2006.

An online keyword auction represents a double-sided auction where there may be a buyer and a seller. There have been several attempts to design budget balanced mechanisms for double-sided auctions where both the buyers and sellers are strategic and the goods are either homogeneous or heterogeneous. When designing a mechanism for implementing a trading market such as a double-sided auction, there are several key properties that are desirable to maintain. Some of the more important ones are individual rationality ("IR")—to make it worthwhile for all traders to participate, incentive compatibility ("IC")—to give incentive to traders to report their true value to the mechanism, and budget balance ("BB")—not to run the mechanism on a loss. See for example, McAfee R. P. A Dominant Strategy Double Auction, Journal of Economic Theory, Volume 56, pages 434-450, 1992, and Y. Bartal, R. Gonen and P. La Mura, Negotiation-range Mechanisms: Exploring the Limits of Truthful Efficient Markets, Electronic Commerce 2004: Proceedings of the 5th ACM Conference on Electronic Commerce, 2004. In McAfee, a mechanism is developed that, given valuations of buyers and sellers, produces an allocation (which are the trading players) and a matching between buyers and sellers such that the mechanism is IR, IC, and BB.

What is needed is a system and method for a double-sided auction that may optimize the reserve price and allocation of web page placements. Such a system and method should be able to maximize revenue while bounding any loss of efficiency of the online keyword auction.

SUMMARY OF THE INVENTION

Briefly, the present invention may provide a system and method for optimizing the reserve price and allocation of web page placements in an online keyword auction using generalized trade reduction. To do so, a generalized trade reduction engine may be provided to convert an implementation of an online keyword auction into a double-sided auction that may optimize the reserve price and allocation of web page placements to maximize revenue. An online keyword auction may be converted into a double-sided market by turning every bidder in the auction into a buyer and every web page placement into a virtual seller. The allocation of buyers and sellers may be divided into disjoint procurement sets and the generalized trade reduction engine may add or remove procurement sets in iterations until conditions of competition among remaining traders may be fulfilled to optimize the reserve price and allocation of web page placements to maximize revenue.

In particular, given an implementation of an online keyword auction and a set of bidders which is closed under replacement, a generalized trade reduction method may divide the bidders for a keyword into procurement sets of pairs of a bidder and a web page placement by matching buyers and web page placements. In an embodiment, a valuation may be determined for each bidder and a cost may be assigned to each web page placements. Then a list of the bidders sorted in order from highest valuation to lowest valuation may be matched with a list of the web page placements sorted in order from lowest cost to highest cost. The generalized trade reduction method may go over the procurement sets in order by increasing value to determine whether external competition exists for each trader in the procurement set that also belongs to the set of traders closed under replacement and to determine whether internal competition exists for each trader in the procurement set that does not also belong to the set of traders closed under replacement. If both external competition and internal competition exists, the procurement set and the traders in the procurement set may be kept for trading. Otherwise, the procurement set and the traders in the procurement set may be removed from trading, and a web page placement may be removed from the allocation of web page placements for the keyword. If there exists external and internal competition for each of the procurement sets and no procurement set was removed, then a web page placement may be added to the allocation of web page placements and the bidders for the keyword may again be divided into procurements sets so that the generalized trade reduction engine may go over the procurement sets to determine whether external competition and internal competition exists. Thus, the generalized trade reduction engine may add or remove procurement sets in iterations until conditions of competition among remaining traders may be fulfilled and buyers in the procurement sets retained for trading may be charged at least the reserve price for buying the web page placement for display of an advertisement. The reserve price may be updated by setting the reserve price to be the cost of the web page placement with a highest assigned cost.

The present invention may thus be used to learn a better estimate of the reserve price in an online keyword auction. As conditions in the market change, the present invention can determine whether to increase as well as decrease the reserve price to improve revenue. By learning the optimized reserve price, the system and method may also determine an optimized allocation of web page placements for display of advertisements for the online keyword auction. Other advantages will become apparent from the following detailed description when taken in conjunction with the drawings, in which:

DETAILED DESCRIPTION

Exemplary Operating Environment

Figure 1:
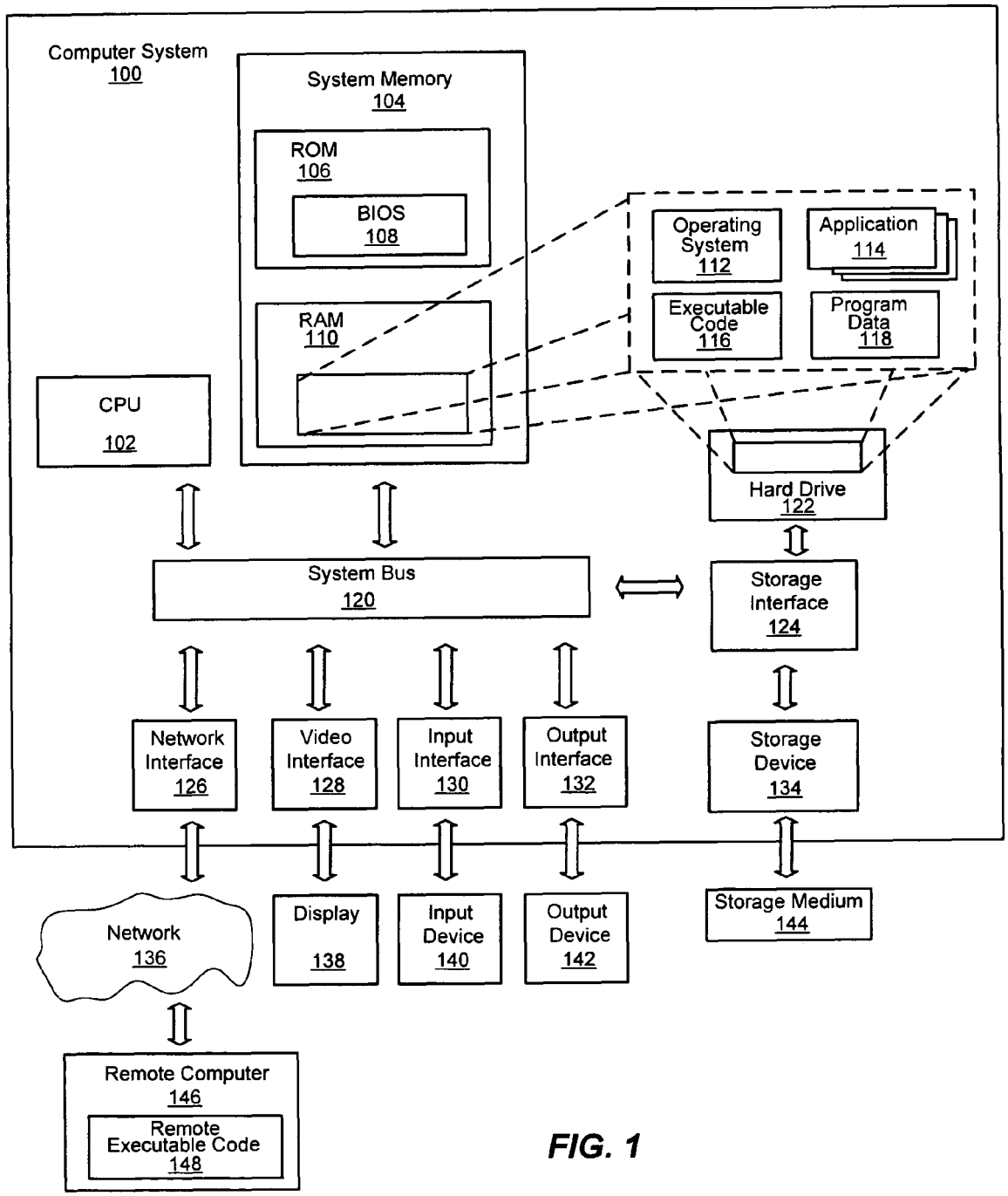
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information-delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Optimizing the Reserve Price and Allocation of Web Page Placements in an Online Keyword Auction Using Generalized Trade Reduction The present invention is generally directed towards a system and method for optimizing the reserve price and allocation of web page placements in an online keyword auction using generalized trade reduction. More particularly, given an online keyword auction, an implementation of an IR, IC, and BB mechanism for a double-sided auction may be output that may optimize the reserve price and allocation of web page placements to maximize revenue while bounding any loss of efficiency of the online keyword auction. As used herein, a web page placement may mean a location on a web page designated for placing an item for display. The item may be an advertisement, content, a product, a service, or any other item that may be auctioned. A web page placement may also include additional information such as a target group of visitors to be shown the item. An online keyword auction may be converted into a double-sided market by turning every bidder in the auction into a buyer and every web page placement into a virtual seller. The allocation of buyers and sellers may be divided into disjoint procurement sets. The generalized trade reduction algorithm may add or remove procurement sets in iterations until conditions of competition among remaining traders may be fulfilled, thereby optimizing the reserve price and allocation of web page placements to maximize revenue.

As will be seen, the framework may be used to determine when to increase or decrease the reserve price and the allocation of web page placements to improve revenue. As will be understood, the various block diagrams, flow charts and scenarios described herein are only examples, and there are many other scenarios to which the present invention will apply.

Figure 2:
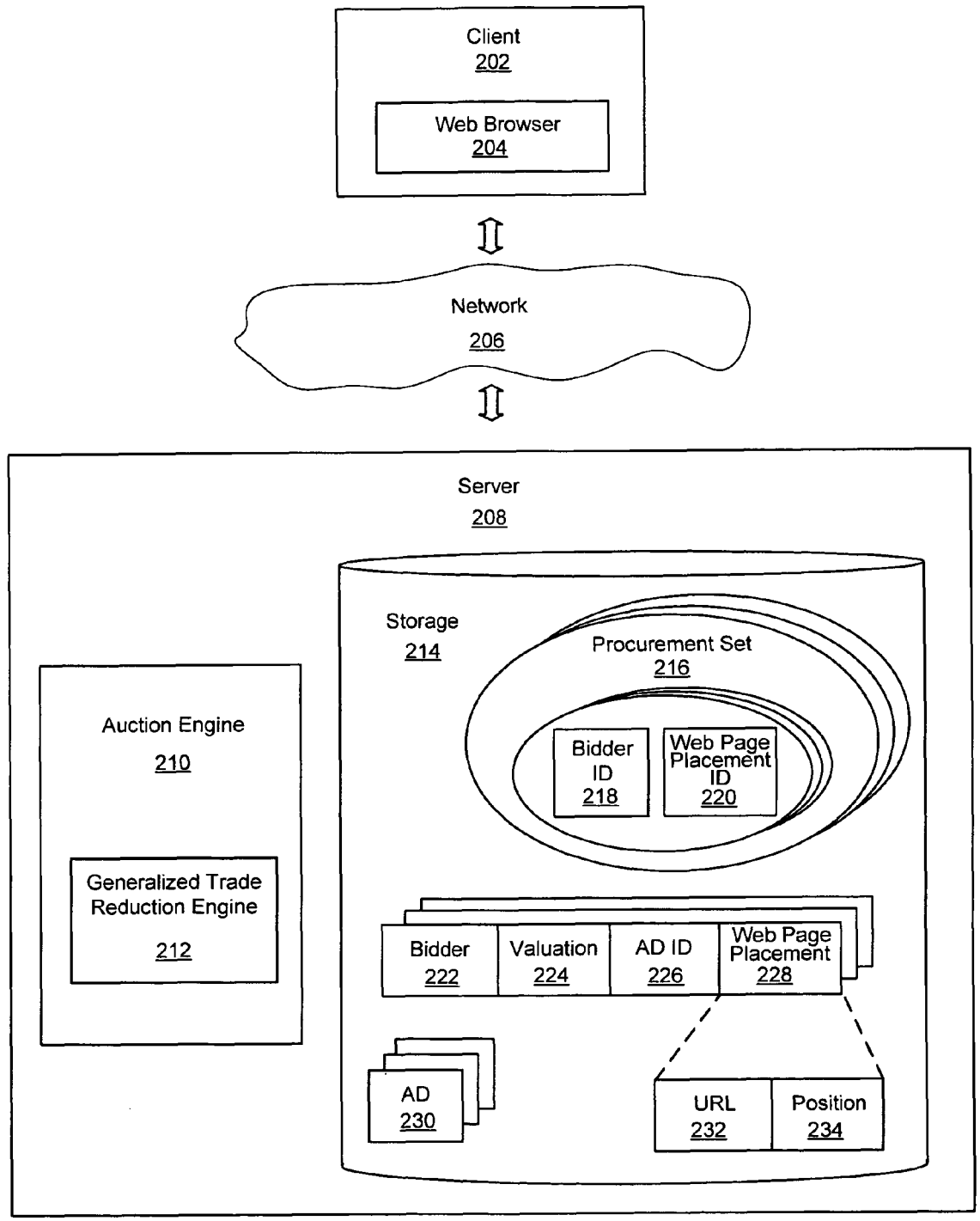
FIG. 2 is a block diagram generally representing an exemplary architecture of system components for optimizing the reserve price and allocation of web page placements in an online keyword auction using generalized trade reduction, in accordance with an aspect of the present invention.

Turning to FIG. 2 of the drawings, there is shown a block diagram generally representing an exemplary architecture of system components for optimizing the reserve price and allocation of web page placements in an online keyword auction using generalized trade reduction. Those skilled in the art will appreciate that the functionality implemented within the blocks illustrated in the diagram may be implemented as separate components or the functionality of several or all of the blocks may be implemented within a single component. For example, the functionality of the generalized trade reduction engine 212 may be included in the same component as the auction engine 210. Or the functionality of the generalized trade reduction engine 212 may be implemented as a separate component from the auction engine 210. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 208 by a network 206. The client computer 202 may be a computer such as computer system 100 of FIG. 1. The network 206 may be any type of network such as a local area network (LAN), a wide area network (WAN), or other type of network. A web browser 204 may execute on the client computer 202 and may include functionality for receiving a search request which may be input by a user entering a query. The web browser 204 may include functionality for receiving a query entered by a user and for sending a query request to a server to obtain a list of search results. In general, the web browser 204 may be any type of interpreted or executable software code such as a kernel component, an application program, a script, a linked library, an object with methods, and so forth.

The server 208 may be any type of computer system or computing device such as computer system 100 of FIG. 1. In general, the server 208 may provide services for query processing and may include services for providing a list of auctioned advertisements to accompany the search results of query processing. In particular, the server 208 may include an auction engine 210 for choosing advertisements for web page placement locations for online keyword auctions, and a generalized trade reduction engine 212 for converting an online keyword auction into an implementation of an IR, IC, and BB mechanism for a double-sided auction that may optimize the reserve price and allocation of web page placements in the online keyword auction to maximize revenue while bounding any loss of efficiency of the online keyword auction. Each of these modules may also be any type of executable software code such as a kernel component, an application program, a linked library, an object with methods, or other type of executable software code.

The server 208 may be operably coupled to a database of information such as storage 214 that may include a bidder 222 that may be associated with a valuation (or bid amount) 224 for an advertisement 230 referenced by advertisement ID 226 to be displayed according to the web page placement 228. The web page placement 228 may include a Uniform Resource Locator (URL) 232 for a web page, and a position 234 for displaying an advertisement on the web page. Any type of advertisements 230 may be associated with an advertisement ID 226. Advertisers may have multiple advertiser IDs 226 representing several bid amounts for various web page placements, and the reserve price and allocation of web page placements in the online keyword auction may be optimized using the generalized trade reduction engine to maximize revenue. The generalized trade reduction engine may turn every web page placement in the online keyword auction into a virtual seller in a double-sided auction, and create procurements sets 216 of buyer-seller pairs that may be represented by a bidder ID 218 and a web page placement ID 220.

The auction engine 210 may provide services to support an online keyword auction for bidders to bid on a keyword of a user's search query for displaying an advertisement in the advertising space allocated within that user's search results. In an online keyword auction, the traders are buyers that provide a bid representing the valuation of the trader. Consider a model of N traders divided into sets of trade. The sets of trade may be referred to as procurement sets defined as follows: a procurement set s may be the smallest set of traders that is required for trade to occur.

The generalized trade reduction engine 212 may provide services to turn the implementation of the online keyword auction into an implementation of an IR, IC, and BB mechanism for a double-sided auction that may optimize the reserve price and allocation of web page placements in the online keyword auction to maximize revenue. In a double-sided auction, a procurement set may be a pair of a buyer and a seller. Every web page placement in the online keyword auction may be turned into a virtual seller in the double-sided auction, and procurements sets of buyer-seller pairs may be created. Consider the set of all procurement sets to be defined as S and assume that any allocation may be a disjoint union of procurement sets.

Each trader i, $1 \leq i \leq n$, may assign a real value $v_i(s)$ to each possible procurement set $s \in S$. Namely, $v_i(s)$ may denote the valuation of trader i on procurement set s. Assume that for each trader i, $v_i(s)$ may denote i's private value and that i may be a single value trader defined as follows: if $v_i(s_j) > 0$, then for every other $s_k$, $k \neq j$, either $v_i(s_k) = v_i(s_j)$ or $v_i(s_k) = 0$. For the ease of notation, the value of trader i may be denoted by $v_i$ for any procurement set s such that $v_i(s) > 0$. Consider the set $V_i \subseteq R$ to denote the set of all possible valuations $v_i$. The set of all possible valuations of all the traders may be denoted by $V = V_1 \times \ldots \times V_n$. Furthermore, consider $v_{-i} = (v_1, \ldots, v_{i-1}, v_{i+1}, \ldots, v_n)$ to denote the vector of valuations of all the traders besides trader i, and consider $V_{-i}$ be the set of all possible vectors $v_{-i}$. The value of a procurement set, $s \in S$, may be denoted by $W(s)$ such that $$W(s) = \sum_{i \in s} v_i(s) + F(s),$$

where F is some function that assigns a constant to procurement sets. Consider the size of a procurement set s be denoted as $|d|$.

A mechanism M representing the implementation of the online keyword auction may define an allocation and payment rules, such that $M=(R, P)$. A payment rule P may determine i's payment $p_i$ where P is a function $P: V \to \Re^N$. Assume that the implementation of the online keyword auction requires traders to report their values. The reported value $b_i \in V_i$ of trader i may represent a bid for a keyword in the online keyword auction and might be different from the trader's private value $v_i$. Consider $b \in V$ to denote the bids of all traders who are buyers in the online keyword auction. Making a standard assumption that traders have quasi-linear utility so that when trader i trades and pays $p_i$ then the trader's utility may be denoted by $u_i(v_i, b_{-i}) = v_i - p_i, u_i: V \Rightarrow \Re$. Assume also that traders are rational utility maximizers.

Mechanism M may be considered budget balanced (BB) if $$\sum_{i \in N} p_i \geq 0$$

for any bids $b \in V$. M may be considered Incentive-Compatible (IC) in dominant strategies if for any trader i, value $v_i$ and any $b_{-i} \in V_{-i}$, $u_i(v_i, b_{-i}) \geq u_i(b)$ meaning that for any trader i, bidding $v_i$ maximized i's utility over all possible bids of the other traders. M may be considered (ex-post) Individually Rational (IR) if for any trader i, value $v_i$ and any $b_{-i} \in V_{-i}$, $u_i(v_i, b_{-i}) \geq 0$ meaning that for all possible bids of the other traders, trader's i utility may be non-negative. Note that since such mechanisms may be normalized IR, if a trader does not trade, then the trader pays 0 and has utility 0.

A generalized trade reduction algorithm is presented herein that, given an IR and IC mechanism M that implements an online keyword auction, may turn M into IR, IC and BB mechanism for a double-sided auction. The algorithm presented creates procurement sets, and the algorithm may remove and add them in iterations until conditions of competition among the traders may be fulfilled. In order to present the competition conditions, several definitions may first be introduced, including definitions of a replacement set, internal competition, and external competition.

For any trader, $i \in N$, consider the set $R_i \subseteq N \setminus \{i\}$ to denote a replacement set of i, if for any procurement set $s \in S$ such that $i \in s$ and $R_i \cap s = 0$, $s \setminus \{i\} \cup R_i \in S$. For example, in a double-sided auction the replacement set for any buyer may be simply any other buyer. Note that a set may replace a single trader. Furthermore, this relationship may be transitive but not necessarily symmetric. If i may be a replacement set for j, it is not necessarily true that j may be a replacement set for i.

For any allocation A, procurement set $s \subseteq A$, and any $i \in s$, consider $R_i(A, s)$ to denote an internal competition for i with respect to A and s, if $R_i(A, s) \subseteq N \setminus A$ may be a replacement set for i such that $T = s \setminus \{i\} \cup R_i(A, s) \in S$ and $W(T) \geq 0$.

For any allocation A, procurement set $s \subseteq A$, and any $i \in s$, consider $E_i(A, s)$ to denote an external competition for i with respect to A and s, if $E_i(A, s) \subseteq N \setminus A$ may be a set such that $T = s \setminus \{i\} \cup E_i(A, s) \in S$ and $W(T) \geq 0$.

Assume, without loss of generality, that there may be no ties between the values of any allocations, and, in particular, there may be no ties between values of procurement sets. In the case of ties, ties can be broken by using the identities of the traders. So, for any allocation A, procurement set s and trader i with external competition $E_i(A, s)$, there may exist exactly one set representing the maximally valued external competition. Accordingly, a set $X \subset N$ may be considered closed under replacement if $\forall i \in X$, then $R_i \subset X$.

The set X may be used to denote a set closed under replacement that may satisfy the conditions of competition needed for a mechanism to maintain IC, IR and BB. Furthermore, assume that all of the sets which define competition required for IC, IR and BB in a mechanism M to be closed under replacement. Given a set $X \subset N$ that is closed under replacement, consider a mechanism to be defined as an X-external mechanism, if:
1. each trader $i \in X$ may have an external competition;
2. each trader $i \notin X$ may have an internal competition;
3. for all traders $i_1, \ldots, i_t \in s \setminus X$, there may exist $R_{i_1}(A,s), \ldots, R_{i_t}(A,s)$ such that for every $i_z \neq i_q$, $R_{i_z}(A,s) \cap R_{i_q}(A,s) = \emptyset$; and
4. for every procurement set $s \in S$, then $s \cap X \neq \emptyset$.

The choice of X may be crucial in an embodiment. In general, X should be chosen as small as possible.

The generalized trade reduction algorithm presented may ensure that for any allocation, there may be the desired types of competition. So, given a mechanism M that is IC and IR with allocation A, the generalized trade reduction algorithms may turn M into an X-external mechanism. The generalized trade reduction algorithm may utilize a dividing function D to divide allocation A into disjoint procurement sets. For instance, the dividing function D may divide the bidders for a keyword into procurement sets of pairs of a bidder and a web page placement. The algorithm may order the procurements sets defined by D in order of increasing value. For any procurement set, there may be a desired type of competition that depends on the traders who compose the procurement set. The generalized trade reduction algorithm may go over the procurement sets in order by increasing value and may remove any procurement set that does not have the desired competition. The reduction of procurement sets may also be referred to as a trade reduction.

If there may be no procurement set removed, the algorithm may add a web page placement that may be used to create an additional procurement set, and the generalized trade reduction algorithm may go over the procurement sets in order by increasing value and may remove any procurement set that does not have the desired competition. The addition of a web page placement that may be used to create an additional procurement set may continue to iterate until a procurement set may finally be removed. This may adjust the level of competition for optimizing reserve price and allocation of web page placements.

Formally, consider D to denote a dividing function if for any allocation A and the traders' value vector v, D may divide the allocation into disjoint procurements sets $s_1, \ldots, s_k$ such that $\cup s_j = A$ and for any trader i with value $v_i$ if $i \in s_{j_1}$ and $t \in s_{j_2}$ such that $j_1 \geq j_2$ then for any value $v'_i \geq v_i$ of trader i and division by D into $s'_1, \ldots, s'_k$ such that $i \in s'_{j'_1}$, and $t \in s'_{j'_2}$, then $j'_1 \geq j'_2$.

Figure 3:
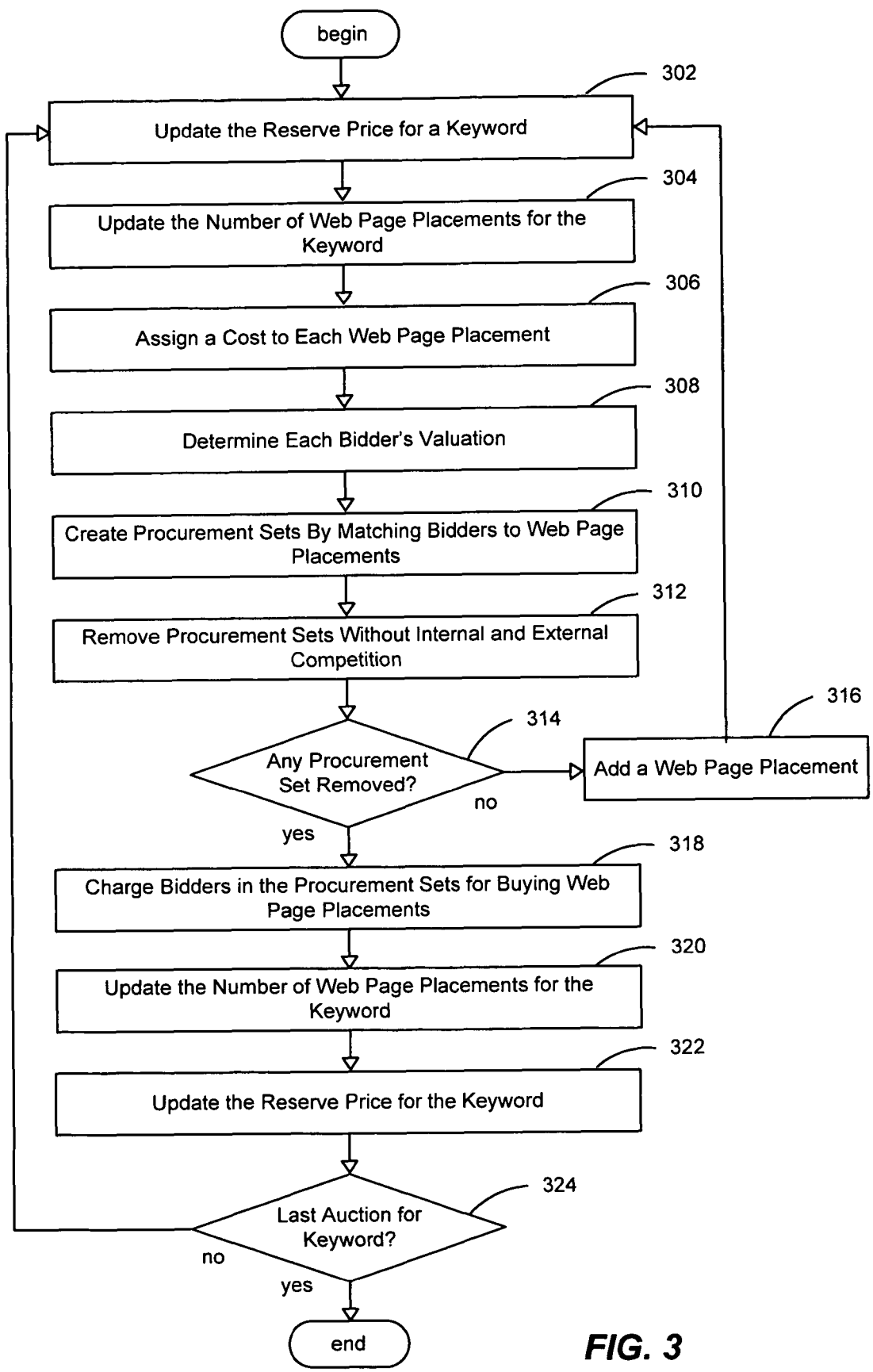
FIG. 3 is a flowchart generally representing the steps undertaken in one embodiment for optimizing the reserve price and allocation of web page placements in an online keyword auction using generalized trade reduction, in accordance with an aspect of the present invention.

FIG. 3 presents a flowchart generally representing the steps undertaken in one embodiment for optimizing the reserve price and allocation of web page placements in an online keyword auction using generalized trade reduction. Given an implementation of an IR and IC mechanism M for an online keyword auction, a set $X \subset N$ which is closed under replacement, a dividing function D, and allocation A, the steps of a generalized trade reduction engine may operate by performing the steps of FIG. 3 to turn the implementation of an IR and IC mechanism M of an auction engine for single-valued traders making trades in an online keyword auction into an implementation of an IR, IC, and BB mechanism for a double-sided auction that may optimize the reserve price and allocation of web page placements to maximize revenue. A reserve price may be updated at step 302 for a keyword in the online keyword auction and the number of web page placements for the keyword may be updated at step 304. For the first time that steps 302 and 304 may be initially executed in each iteration for the auction of the keyword, the reserve price updated may be the previously used reserve price in the last iteration of the online auction of the keyword, and the number of web page placements updated may be the previously used number of web page placements in the last iteration of the online auction of the keyword. During an iteration of the online auction of the keyword, the reserve price may be updated by setting the reserve price to be the cost of the web page placement with a highest assigned cost, and the number of web page placements may be incremented to reflect the addition of a web page placement.

At step 306, a cost may be assigned to each web page placements. In an embodiment, a monotonically decreasing function may be used to set the costs of the web page placements by assigning the lowest cost to the most desirable web page placement and the highest cost to the least desirable web page placement whereby the cost of the least desirable web page placement may be set to the auction reserve price for the keyword. For example, the first web page placement may be the most desirable because it may have the highest probability to be clicked on regardless of the advertisement presented in it. The second web page placement may be the second most desirable because it may have the second highest probability to be clicked on, and so forth. At step 308, each bidder's valuation may be determined for a web page placement. In an embodiment, each bidder's valuation may be the advertisement weight*bid, where the advertiser weight may be determined for each advertisement by the auction owner.

At step 310, procurement sets may be created by matching bidders to web page placements. In an embodiment, the traders may be divided into procurement sets by using the dividing function D to divide A into procurement sets $s_1, \ldots, s_k \in S$. For instance, the dividing function D may divide the bidders for a keyword into procurement sets of pairs of a bidder and a web page placement. A list of the bidders sorted in order from highest valuation to lowest valuation may be matched with a list of the web page placements sorted in order from lowest cost to highest cost. At step 312, procurements sets without internal and external competition may be removed. This is described in more detail in conjunction with FIG. 4 below. At step 314, it may be determined whether any procurement sets have been removed. If not, a web page placement may be added to the list of web page placements at step 316 and processing may continue at step 302.

If it may be determined that any procurement set has been removed, then bidders in the procurements sets may be charged for buying web page placements at step 318. In an embodiment, the buyer i who won a web page placement may be charge the price of $(\text{weight}_j * \text{bid}_j)/\text{weight}_i$, where j may denote a non-trading bidder with the highest expected value calculated by advertisement $\text{weight}_j * \text{bid}_j$. All non-trading buyers may be charged zero.

At step 320, the number of web page placements may be updated for the keyword. The number of web page placements may be decremented to reflect the removal of a web page placement. At step 322, the reserve price may be updated. In an embodiment, the reserve price may be updated by setting the reserve price to be the cost of the web page placement with a highest assigned cost. In general, the reserve price may be decreased if there is not enough competition and additional web page placements may be added. Conversely, the reserve price may be increased if there is too much competition and web page placements may be removed. At step 324, it may be determined whether there is another auction for the keyword. If so, then processing of the next iteration of an auction for the keyword may continue at step 302 for converting an online keyword auction into a double-sided auction using generalized trade reduction for optimizing reserve price and allocation of web page placements.

Figure 4:
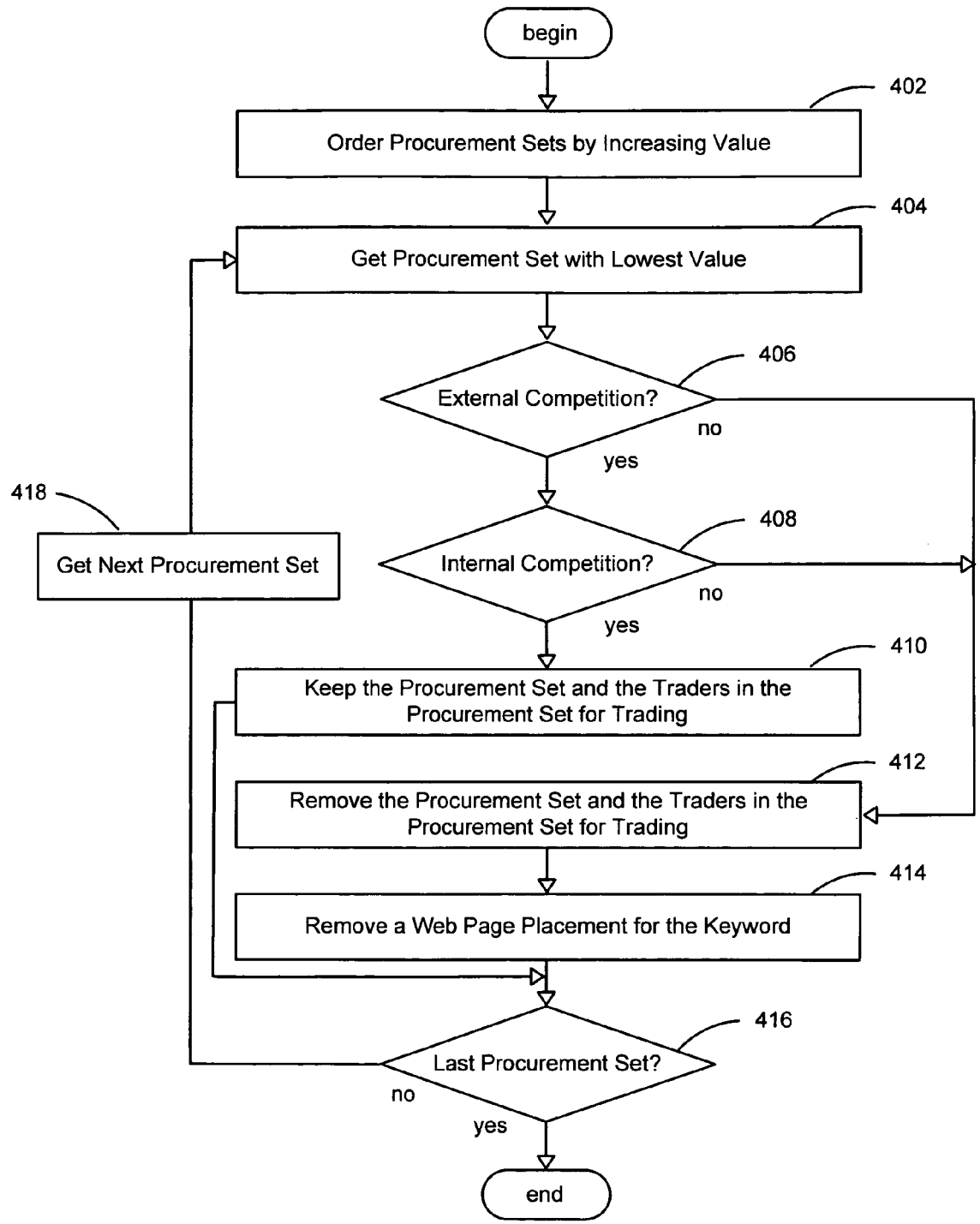
FIG. 4 is a flowchart generally representing the steps undertaken in one embodiment for removing procurement sets without internal and external competition using generalized trade reduction, in accordance with an aspect of the present invention.

FIG. 4 presents a flowchart generally representing the steps undertaken in one embodiment for removing procurement sets without internal and external competition using generalized trade reduction. The procurement sets may be ordered at step 402 by increasing value. The procurement set with the lowest value may be obtained from the procurement sets at step 404. It may be determined at step 406 whether there may be external competition. If so, then it may be determined at step 408 whether there may be internal competition. If it is determined that there may be internal competition, then the procurement set (and the traders in the procurement set) may be kept at step 410 for trading. Otherwise, if it was determined at step 406 that there may not be external competition or if it was determined at step 408 that there may not be internal competition, then the procurement set (and the traders in the procurement set) may be removed at step 412 from trading, and a web page placement may be removed for the keyword at step 414. Thus, if for every $i \in s_j \cap X$ there may be external competition and every $i \in s_j \setminus X$ there may be internal competition, then $s_j$ may be kept. Otherwise, the trade $s_j$ may be reduced, i.e., every $i \in s_j$ may be removed from the allocation.

At step 416, it may be determined whether the last procurement set has been processed. If not, then the next procurement set may be obtained at step 418 and processing may continue at step 404. Otherwise, processing may be finished for removing procurement sets without internal and external competition using generalized trade reduction.

Thus the present invention may use generalized trade reduction to convert an implementation of an online keyword auction into a double-sided auction that may optimize the reserve price and allocation of web page placements to maximize revenue. By turning every bidder in the auction into a buyer and every web page placement into a virtual seller, an online keyword auction may be converted into a double-sided market. The allocation of buyers and sellers may be divided into disjoint procurement sets and the generalized trade reduction method may add or remove procurement sets in iterations until conditions of competition among remaining traders may be fulfilled to maximize revenue.

As can be seen from the foregoing detailed description, the present invention provides an improved system and method for optimizing the reserve price and allocation of web page placements in an online keyword auction using generalized trade reduction. The present invention may be used to learn a better estimate of the reserve price in an online keyword auction. As conditions in the market change, the present invention can determine whether to increase as well as decrease the reserve price to improve revenue. By learning the optimized reserve price, the system and method may also determine an optimized allocation of web page placements for display of advertisements for the online keyword auction. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for an online keyword auction, comprising:
dividing, by one or more computing devices, a plurality of bidders for a keyword into a plurality of procurement sets of at least one pair of a bidder and a web page placement;
obtaining, by the one or more computing devices, a procurement set from the plurality of procurement sets;
determining, by the one or more computing devices, external competition exists for each bidder in the procurement set that also belongs to a set of at least one bidder closed under replacement;
determining, by the one or more computing devices, internal competition exists for each bidder in the procurement set that does not also belong to the set of at least one bidder closed under replacement;
obtaining, by the one or more computing devices, another procurement set from the plurality of procurement sets;
determining, by the one or more computing devices, that external competition does not exist for each bidder in the another procurement set that also belongs to the set of at least one bidder closed under replacement;
removing, by the one or more computing devices, each bidder in the another procurement set from buying the web page placement for display of an advertisement;
charging, by the one or more computing devices, the at least one bidder in the procurement set for buying the web page placement for display of an advertisement; and
updating, by the one or more computing devices, a reserve price for the keyword.

2. The method of claim 1 further comprising ordering the plurality of procurement sets by increasing value.

3. The method of claim 1 further comprising removing the web page placement for the keyword.

4. The method of claim 1 further comprising obtaining a number of a plurality of web page placements for the keyword in the online keyword auction.

5. The method of claim 1 further comprising obtaining the reserve price for the keyword in the online keyword auction.

6. The method of claim 1 further comprising assigning a cost to each web page placement of a plurality of web page placements for the keyword in the online keyword auction.

7. The method of claim 1 further comprising determining a valuation from each bidder for buying the web page placement for display of an advertisement for the keyword in the online keyword auction.

8. The method of claim 1 further comprising:
determining that at least one procurement set was not removed from the plurality of procurement sets.

9. The method of claim 1 wherein dividing the plurality of bidders for the keyword into the plurality of procurement sets of at least one pair of the bidder and the web page placement comprises matching a plurality of bidders for the keyword to a plurality of web page placements.

10. The method of claim 9 wherein matching the plurality of bidders for the keyword to the plurality of web page placements comprises matching a list of the plurality of bidder sorted in order from highest valuation to lowest valuation with a list of the plurality of web page placements sorted in order from lowest cost to highest cost.

11. The method of claim 1 wherein charging the at least one bidder in the procurement set for buying the web page placement for display of an advertisement comprises charging the at least one bidder at least the reserve price for buying the web page placement for display of the advertisement.

12. The method of claim 1 wherein updating the reserve price for the keyword comprises setting the reserve price to be the cost of a web page placement with a highest assigned cost.

13. A computer-implemented method for an online keyword auction, comprising:

dividing, by one or more computing devices, a plurality of bidders for a keyword into a plurality of procurement sets of at least one pair of a bidder and a web page placement;

obtaining, by the one or more computing devices, a procurement set from the plurality of procurement sets;

determining, by the one or more computing devices, external competition exists for each bidder in the procurement set that also belongs to a set of at least one bidder closed under replacement;

determining, by the one or more computing devices, internal competition exists for each bidder in the procurement set that does not also belong to the set of at least one bidder closed under replacement;

obtaining another procurement set from the plurality of procurement sets;

determining that internal competition does not exist for each bidder in the another procurement set that also belongs to the set of at least one bidder closed under replacement;

removing each bidder in the another procurement set from buying the web page placement for display of an advertisement;

charging, by the one or more computing devices, the at least one bidder in the procurement set for buying the web page placement for display of an advertisement; and updating, by the one or more computing devices, a reserve price for the keyword.

\* \* \* \* \*